(12) United States Patent
Grund et al.

(10) Patent No.: US 11,133,933 B1
(45) Date of Patent: Sep. 28, 2021

(54) RAPID SECURE AUTHENTICATION AND COMMUNICATIONS THROUGH MULTITENANT COMPONENTS IN PROVIDER NETWORKS

(71) Applicant: Amazon Technologies, Inc., Seattle, WA (US)

(72) Inventors: Martin Grund, Lafayette, CA (US); Mikhail Krestyaninov, Kirkland, WA (US); Luxiang Yin, San Jose, CA (US); Davide Pagano, Fremont, CA (US); William Michael McCreedy, Seattle, WA (US); Ippokratis Pandis, Menlo Park, CA (US)

(73) Assignee: Amazon Technologies, Inc., Seattle, WA (US)

( * ) Notice: Subject to any disclaimer, the term of this patent is extended or adjusted under 35 U.S.C. 154(b) by 176 days.

(21) Appl. No.: 16/199,000

(22) Filed: Nov. 23, 2018

(51) Int. Cl.
| | | |
|---|---|---|
| *H04L 29/06* | (2006.01) |
| *H04L 9/32* | (2006.01) |
| *G06F 16/2458* | (2019.01) |
| *G06F 16/27* | (2019.01) |
| *G06F 9/455* | (2018.01) |

(52) U.S. Cl.
CPC ........ *H04L 9/3226* (2013.01); *G06F 16/2471* (2019.01); *G06F 16/27* (2019.01); *H04L 9/3215* (2013.01); *H04L 63/0281* (2013.01); *H04L 63/0428* (2013.01); *G06F 9/45541* (2013.01); *G06F 9/45545* (2013.01)

(58) Field of Classification Search
CPC . H04L 9/3226; H04L 9/3215; H04L 63/0281; H04L 63/0428; G06F 16/2471; G06F 16/27
See application file for complete search history.

(56) References Cited

U.S. PATENT DOCUMENTS

| | | | | |
|---|---|---|---|---|
| 8,037,187 | B2* | 10/2011 | Dawson | G06F 9/5072 709/226 |
| 2003/0046396 | A1* | 3/2003 | Richter | G06F 9/505 709/226 |
| 2006/0167703 | A1* | 7/2006 | Yakov | H05K 3/3421 705/26.1 |
| 2011/0016214 | A1* | 1/2011 | Jackson | G06F 9/505 709/226 |
| 2012/0226808 | A1* | 9/2012 | Morgan | G06Q 30/04 709/226 |
| 2012/0254433 | A1* | 10/2012 | Gujral | G06F 9/5072 709/226 |
| 2013/0318577 | A1* | 11/2013 | Bulusu | H04L 63/08 726/5 |

(Continued)

*Primary Examiner* — Tongoc Tran
(74) *Attorney, Agent, or Firm* — NDWE LLP

(57) ABSTRACT

Techniques for rapid secure authentication and communications through multitenant components in a provider network are described. A main database cluster can request a burst cluster from a burst service, which can provide the main cluster with a shared secret associated with only a selected burst cluster. The main cluster can use the shared secret to encrypt a value that can be passed, via a proxy, to the selected burst cluster in a connection request. The selected burst cluster can validate that the connection request was truly originated by the main cluster by validating the encrypted value using the shared secret.

20 Claims, 10 Drawing Sheets

(56) References Cited

U.S. PATENT DOCUMENTS

| | | | | |
|---|---|---|---|---|
| 2014/0075034 A1* | 3/2014 | Vasudevan | .............. | H04L 47/70 |
| | | | | 709/226 |
| 2014/0123296 A1* | 5/2014 | Subramanian | .......... | H04L 67/10 |
| | | | | 726/26 |
| 2014/0164623 A1* | 6/2014 | Galan | .................... | G06Q 10/06 |
| | | | | 709/226 |
| 2014/0164776 A1* | 6/2014 | Hook | .................. | G06F 21/6218 |
| | | | | 713/171 |
| 2015/0381567 A1* | 12/2015 | Johnson | .................. | H04L 45/54 |
| | | | | 726/12 |
| 2015/0381596 A1* | 12/2015 | Johnson | ................ | G06F 21/105 |
| | | | | 726/6 |
| 2016/0147550 A1* | 5/2016 | McWilliams | ......... | G06F 11/301 |
| | | | | 718/1 |
| 2016/0179840 A1* | 6/2016 | Dani | ................... | G06F 16/1847 |
| | | | | 707/824 |
| 2018/0316681 A1* | 11/2018 | Frahim | ................ | H04L 63/101 |

\* cited by examiner

RAPID SECURE AUTHENTICATION AND COMMUNICATIONS THROUGH MULTITENANT COMPONENTS IN PROVIDER NETWORKS

BACKGROUND

In provider networks, it is often necessary for users to run sensitive workloads within a private area of the provider network, such as a user-specific private network. This may be due to the user processing sensitive information (e.g., financial, medical), where the user is bound by strict data security rules or regulations stipulating how the data must be protected. To ensure that source data, processing operations, code, and/or resulting data remains confidential and protected, users typically constrain these private networks to severely restrict or eliminate the ability to access resources outside of the private network—whether elsewhere in the provider network or outside of the provider network—or for external access into the private network.

However, in many cases it may be important to make use of other resources during such data processing operations. For example, a user running a cluster of database nodes may wish to add an additional cluster of database nodes to assist in processing queries, where an additional pool of database clusters may be readily available. However, with severely "locked down" private networks, it may be difficult or impossible to communicate with an external service to add an additional cluster of nodes, and moreover, the communications necessary to send database query and/or underlying database data to such an additional cluster may need to pass through other multitenant components of the provider network, increasing the chance that this data could be exposed to other users, sent to a wrong destination, etc.

BRIEF DESCRIPTION OF DRAWINGS

Various embodiments in accordance with the present disclosure will be described with reference to the drawings, in which.

DETAILED DESCRIPTION

Figure 1:
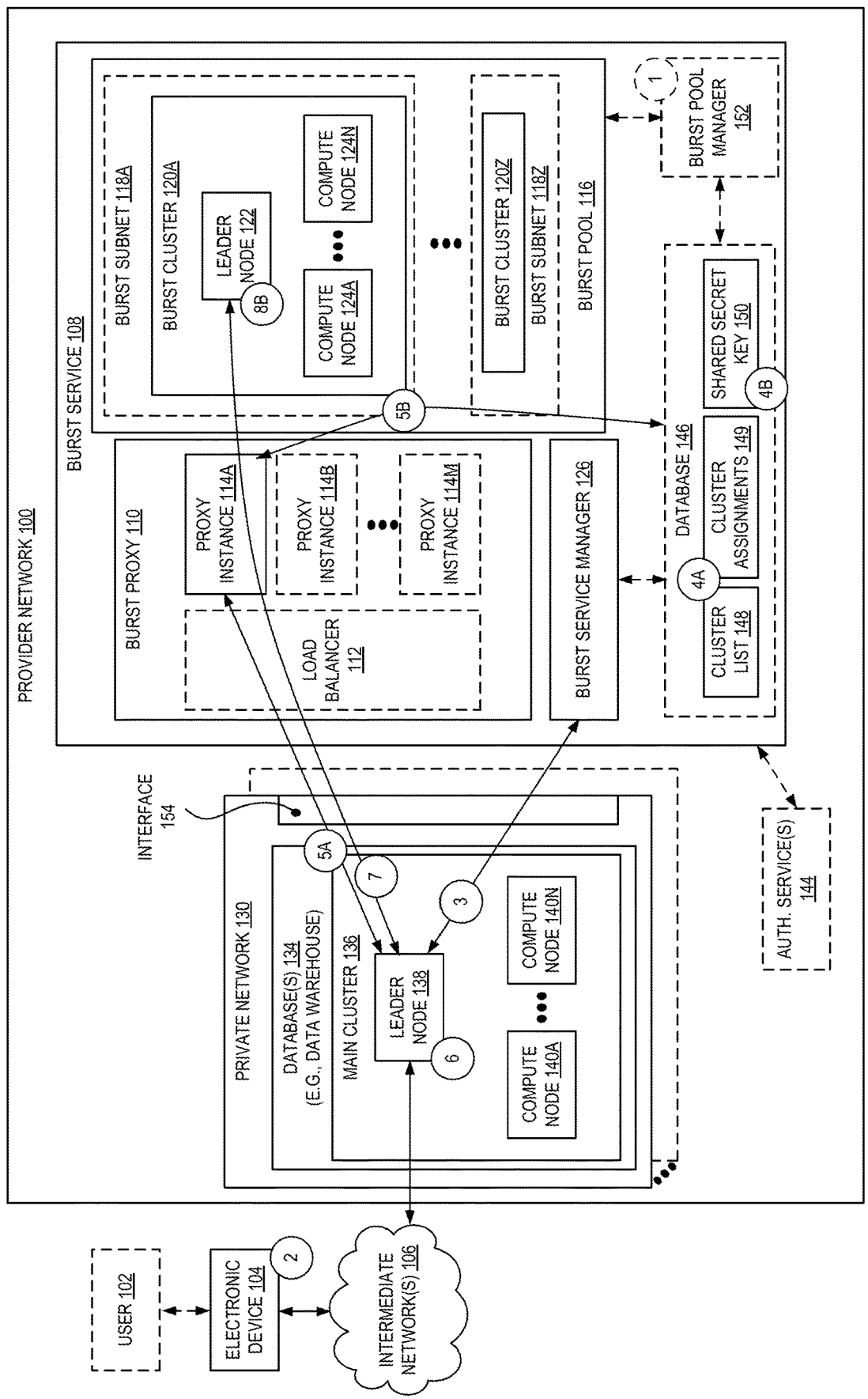
FIG. 1 is a diagram illustrating an environment for rapid secure authentication and communications through multitenant components in a provider network according to some embodiments.

Various embodiments of methods, apparatus, systems, and non-transitory computer-readable storage media for rapid secure authentication and communications through multitenant components in a provider network are described. For example, according to some embodiments, a source cluster of a database or data warehouse is enabled to communicate with a burst service via an endpoint within its private network that is constrained to only access the burst service. The source cluster sends a request to the burst service seeking the allocation of an additional "burst" database cluster to assist in query processing. The burst service selects an available cluster from a pool of clusters and provides the source cluster an identifier of the selected cluster as well as provides access to a shared secret key value that is specifically associated with the selected burst cluster. Upon opening a connection to a burst proxy of the burst service seeking to establish communications with the burst cluster, the burst proxy can authenticate the source cluster and determine that the source cluster has in fact been allocated access to the selected burst cluster. The burst proxy, which may be a multitenant component of the provider network, may thus establish connections with the source cluster and the selected burst cluster. The source cluster may send a message, via the burst proxy, to connect to the burst cluster. This message may include an encrypted value generated by the source cluster using the shared secret key, which the burst proxy does not have access to. The target burst cluster can verify that the encrypted value was in fact generated using the shared secret key, ensuring that the proper source cluster is communicating with the proper burst cluster. Optionally, the source cluster may establish a secure tunnel over the two underlying connections to the burst cluster, eliminating the need for the intermediary burst proxy to even have any access to plaintext elements of the inter-cluster communications.

In embodiments disclosed herein, the setup of the system architecture allows very efficient resource assignment and secured communications between all participating resources. Embodiments can securely authenticate from the source to the burst proxy, and securely authenticate from the source through the burst proxy to the target. Embodiments can also ensure that the proxy cannot incidentally or intentionally contact the wrong destination—which is important due to potentially sensitive data being sent through the proxy—using source to target authentication based on a secret that is not known to the proxy but only to the source and target.

In this description, embodiments are often presented with regard to database applications—e.g., source clusters, destination clusters, etc.—these techniques are not so limited, and may be used in a variety of other contexts, for example, where communications need to be securely implemented between software modules with multitenant components lying in the communications path therebetween. Thus, although some embodiments are used for securely connecting networks, embodiments can also be used to connect transient resources, or even known resources, where a multitenant mediator cannot inspect what is happening.

For further detail, FIG. 1 is a diagram illustrating an environment for rapid secure authentication and communications through multitenant components in a provider network according to some embodiments. The diagram shows a user 102 who may utilize an electronic device 104 such as a Personal Computer (PC), tablet, mobile phone, or similar device to interact with a provider network 100 across one or more intermediate networks 106.

A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s) of the provider network 100, such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks or may indirectly utilize a compute instance by submitting code to be executed by the provider network, which in turn utilizes a compute instance to execute the code (typically without the user having any control of or knowledge of the underlying compute instance(s) involved).

In the example shown in FIG. 1, the user 102 may be utilizing the resources of the provider network 100 to run one or more databases 134. For example, the database(s) 134 may be a data warehouse utilizing a collection of computing resources called nodes, which are organized into a group called a cluster, such as the main cluster 136. In some embodiments, each cluster has a leader node 138 and one or more compute nodes 140A-140N. The leader node 138 receives queries from client applications (e.g., executing within the provider network 100 or outside the provider network 100, such as by electronic device 104), parses the queries, and develops query execution plans. The leader node 138 then coordinates the parallel execution of these plans with the compute nodes 140 and aggregates the intermediate results returned from these nodes 140. The leader node 138 then returns the overall results back to the client applications. In this and other figures, embodiments are described with regard to nodes, clusters, etc., though more generally these techniques and configurations can be used for software modules, where a software module could be an application, a virtual machine, a collection of multiple applications (or virtual machines) executed by one or multiple computing devices, and the like.

The database(s) 134 application(s), in this example, are executed within a private network 130 within the provider network 100. The private network 130 provides logical isolation of the resources within it, despite the fact that the provider network 100 may implement these resources on hardware that is shared with other users, and/or implement the resources on different computing devices at a same or different rack, data center, geographic region, etc. In many cases, a private network 130 by default is heavily locked down such that only a bare minimum of types of network traffic are allowed into the network or out of the network, though users may choose to "open up" the private network 130 as they choose.

Thus, the user 102 may use the database(s) 134 to perform data storage, query processing, etc., of data. The user 102 may also be incredibly sensitive to data security, e.g., with regard to compliance regimes. For example, there are several industries such as finance or healthcare that need to adhere to specific compliance requirements set by various governments, such as HIPAA, SOX, PCI, etc. Many of these requirements deal specifically with information systems and technology, and specify how data must be securely stored, transmitted, etc.

However, the user 102 may desire for the database(s) 134 to have additional processing capacity at times, for example, during times of heavy database usage (e.g., by multiple users, by certain users needing to issue a large number of queries and/or resource-expensive queries, during times when the queries must be processed in a more time-sensitive manner, etc.) Thus, the provider network 100 may provide a burst service 108 allowing users to add additional processing capacity in the form of burst clusters 120A-120Z available in a burst pool 116, which can be added or peered with primary clusters (e.g., main cluster 136) to quickly provide for additional processing capabilities. The burst service 108 may include a burst pool manager 152 which, at optional circle (1), maintains one or multiple uninitialized burst clusters 120A-120Z in a ready state (e.g., by launching specific groupings of VMs with specific software), so they can be quickly granted to requesting clusters, customized for processing, and then quickly contribute to providing processing abilities. Each burst cluster 120A-120Z may be implemented within its own burst subnet 118A-118Z.

The burst pool manager 152 may, as part of launching a burst cluster 120A, generate a shared secret key 150 to be associated with only the burst cluster 120A. The burst pool manager 152 may store the shared secret key 150 (e.g., in a database 146), and may also provide the shared secret key 150 to the burst cluster 120A for later usage. Of course, in other embodiments a shared secret key 150 may be generated and distributed in other ways known to or easily derivable by those of skill in the art—for example, the burst cluster 120A itself may generate a shared secret key 150 (upon or after launch by the burst pool manager 152), keep a copy of the shared secret key 150 and also store it in another location of the burst service 108 such as a database 146.

Accordingly, at circle (2), a query may be issued (here shown as originating with an electronic device 104 outside of the provider network 100, though it could also be originated by another client executed within the provider network 100) that is passed to the leader node 138 for execution. Based on some logic (e.g., an actual or predicted load of the database 134, a number and/or type of queries waiting in a query queue needing to be processed, a complexity of a particular query, etc.), the leader node 138 may desire to utilize additional processing resources in the form of a burst cluster 120 to process this particular query or some future query or queries.

At circle (3), the leader node 138 may send a request via an interface 154 of the private network 130 that may, in some embodiments, only allow communications to particular endpoints of the burst service 108 (to ensure security of the private network 130). The request may be sent to the burst service manager 126 to acquire a burst cluster. The burst service manager 126 may authenticate the request (e.g., via use of information carried within the request, such as an identifier of a user account, a value—such as a signature—created using a user's key, etc.) via use of an authentication/authorization service 144 (or "auth" service (s) 144).

The burst service manager 126 may also, at circle (4A), examine a cluster list 148 that identifies available burst clusters 120 to select a burst cluster that is suitable for the requesting cluster 136 (e.g., based on requirements specified in the acquisition request, characteristics of the main cluster 136, etc.). Upon selecting a burst cluster (for the sake of this example, we assume it to be burst cluster 120A), the burst service manager 126 may update a data structure (e.g., a set of cluster assignments 149, the cluster list 148, etc.) to indicate that this burst cluster 120A has been assigned (or "reserved") for the main cluster 136 by, for example, storing identifiers of each of these clusters together in a record or in association with one another in some manner. The cluster list 148 and cluster assignments 149 may be, for example, tables, records, or databases of a database 146 used by the burst service 108, which may be provided by another database service of the provider network 100.

The burst service manager 126 at circle (4B) may also obtain the shared secret key value 150 that is specific to the selected burst cluster 120A and cause it to be provided to (or otherwise made available to) the main cluster 136. As indicated above, the shared secret key value may be a value generated by the burst pool manager 152 when it generates a burst cluster in the pool 116, or may be generated by the burst service manager 126 or the burst cluster 120A itself, etc. In some embodiments, the burst service manager 126 obtains (e.g., by generating or retrieving from a data store such as a database 146) the shared secret key value 150. The shared secret key value 150 may be a string of random alphanumeric symbols, for example.

The burst service manager 126 may return a message (or response) back to the leader node 138 indicating that a burst cluster has been reserved for it. The message may include, for example, an identifier of the burst cluster 120A (e.g., a network address of the cluster, a unique name/identifier of the cluster, etc.). The message may also include the shared secret key 150 itself, or an identifier of a location where the shared secret key value 150 can be obtained—e.g., an identifier of a path or location of the shared secret key 150 within a secure storage location of the provider network, for example.

At this point, the leader node 138 at circle (5A) may send a request to a burst proxy 110 of the burst service 108 to establish a connection to a burst cluster. The burst proxy 110 may include one or more proxy instances 114A-114M (e.g., specialized proxy software implemented within a virtual machine, for example), which may be implemented behind a load balancer 112. As noted herein, the burst proxy 110 (and the burst service manager 126) may be multitenant components used by multiple users, though in some embodiments each burst cluster 120 may be used only by one user, and optionally terminated afterward. As shown, the request may be routed (e.g., by a load balancer 112) to a first proxy instance 114A.

The proxy instance 114A may authenticate the calling leader node 138 and/or authorize that the leader node 138 is able to connect to burst clusters, and specifically, that the leader node 138 is authorized to connect to a particular burst cluster 120A. For example, the request may include the identifier of the burst cluster 120A (e.g., from the message returned to the leader node 138 by the burst service manager 126), which the proxy instance 114A may use (and/or the identifier of the leader node 138/main cluster 136) to perform a lookup in the set of cluster assignments 149 at circle (5B).

If no mapping is found in the set of cluster assignments 149, the proxy instance 114A may send back a denial message and/or terminate the connection. Otherwise, when it finds that an association between the leader node 138/main cluster 136 and the burst cluster 120A, the proxy instance 114A may continue with establishing a connection with the leader node 138, which may be a secured/encrypted communication channel such as a Transport Layer Security (TLS) or Secure Sockets Layer (SSL) connection. Optionally, the proxy instance 114A may also create a connection with the selected burst cluster 120A as well, which may or may not be secured/encrypted.

The leader node 138, at circle (6A), may generate data (e.g., an encrypted value) using the shared secret key 150 to be sent to the burst cluster 120A. In some embodiments, the leader node 138 may use the shared secret key 150 returned at circle (3) by the burst service manager 126 to encrypt some piece of information, such as the identifier of the selected burst cluster 120A or another element of data that can similarly be determined by the burst cluster 120A itself. As another example, at optional circle (6B) the leader node 138 may obtain the shared secret key 150 (e.g., from a secure storage location, using the location information provided by the burst service manager 126), and use this shared secret key 150 to encrypt a particular value.

The encrypted value may be sent within another request message (e.g., to connect to one another) at circle (7) that is sent through the proxy instance 114A to the burst cluster 120A.

Upon receipt of the message, the leader node 122 can authenticate the request at circle (8A) (e.g., via auth. service (s) 144), and can determine whether the encrypted value was properly created with an authentic copy of the shared secret key 150 at circle (8B). For example, the leader node 122 can obtain a copy of the shared secret key 150 (e.g., from a secure storage location of the provider network 100, or from having it be pre-installed on the leader node 122 at time of its creation) and use it to either decrypt the encrypted value, or alternatively to re-create the encrypted value using the same algorithm (as used by the leader node 138 when generating the encrypted value) to see if its encrypted value matches the version that it received. If the leader node 122 can confirm that the encrypted value is proper—and thus, that it was validly created with a copy of the correct shared secret key 150—the leader node 122 can be satisfied that it properly got the correct message from the burst proxy 110, which may be handling lots of traffic for multiple users. Accordingly, even if the burst proxy 110 was acting improperly and forwarding such a request from an incorrect source, the leader node 122 could detect this via this authentication process involving the shared secret key 150. At this point, the leader node 122 may respond to the connection request from the leader node 138, and the two may begin setup operations for query processing, and then the actual offloading of one or more queries from the main cluster 136 to the burst cluster 120A.

Notably, this process allows for the establishment of communications between a main cluster and a burst cluster, at scale, in a secure manner so an intermediate agent—such as the burst proxy 110 or other entities—cannot see what is going on between the clusters. Moreover, both clusters can mutually agree that they are talking to the right endpoint, which may be extremely important such as in scenarios requiring the highest of compliance and security. Thus, embodiments can authenticate network channels (e.g., long-lived Transmission Control Protocol (TCP) connections) between clusters without needing to trust any intermediaries.

Figure 2:
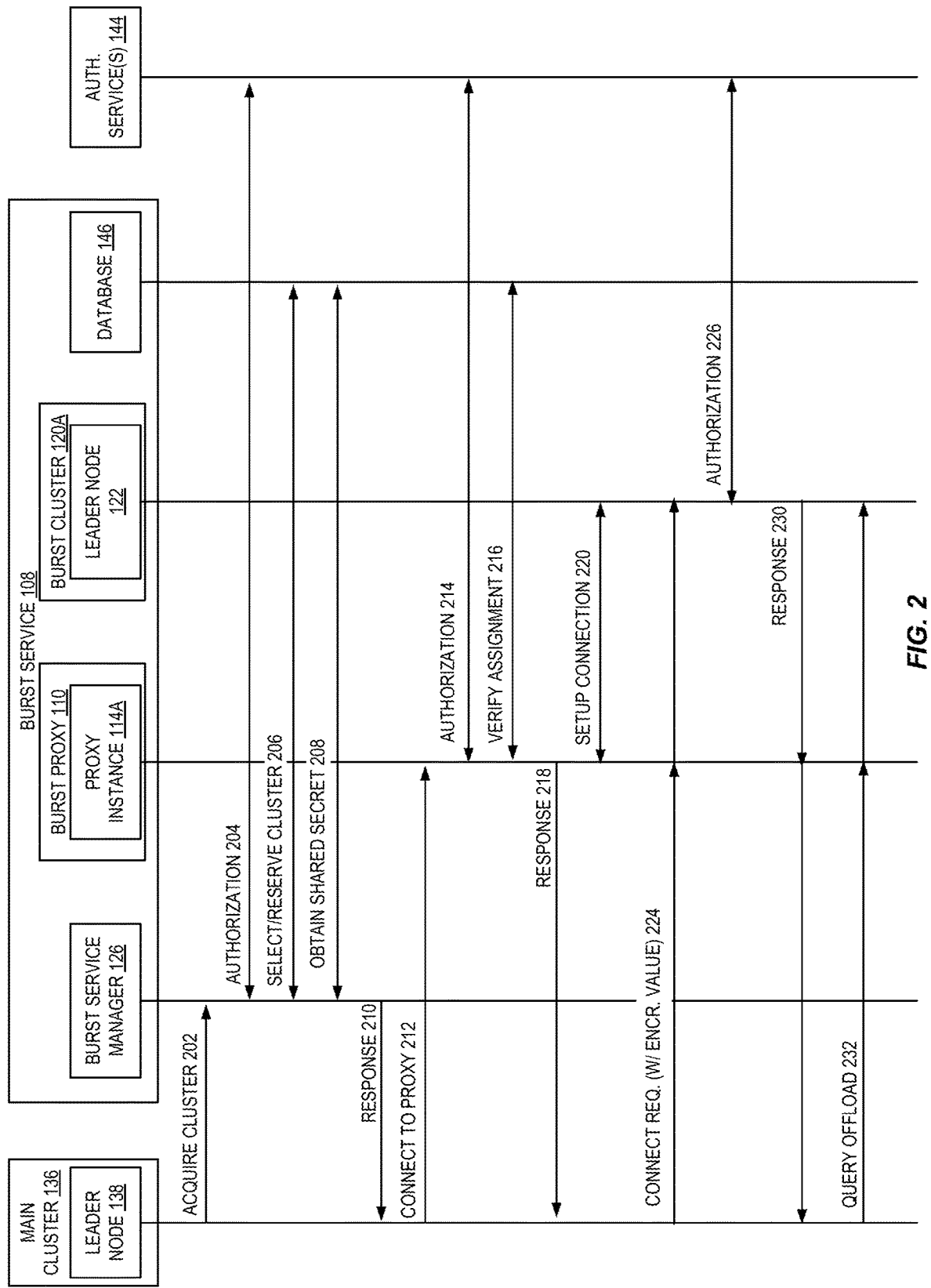
FIG. 2 is a diagram illustrating exemplary messaging between components of an environment for acquiring a cluster according to some embodiments.

For further detail we turn to FIG. 2, which is a diagram illustrating exemplary messaging between components of an environment for acquiring a cluster according to some embodiments. FIG. 2 shows an example messaging flow between a leader node 138 of a main cluster 136, a burst service manager 126 and proxy instance 114A (of a burst proxy 110) and a leader node 122 (of a burst cluster 120A) and a database 146 operating as part of a burst service 108, along with a secure storage 142 service and authentication/authorization service(s) 144. It is to be understood that this messaging flow is only one messaging flow that could be used to implement some embodiments, and various alternate formulations with more or fewer messages, messages in different orderings, more or fewer or different components, etc., could alternatively be used and implemented by one of ordinary skill in the art in possession of this disclosure to implement various embodiments described herein.

The leader node 138 may initiate this process by sending an acquire cluster 202 message to the burst service manager 126 to acquire a cluster. The message may be signed using a key associated with the leader node (or user), which can be used by the burst service manager 126 to authenticate the source of the message. The message may be sent as an HTTP request message to an endpoint of the burst service 108, which may be one of the limited number of endpoints reachable from the private network 130 via the interface 154.

In response, the burst service manager 126 may authorize 204 the leader node 138 (e.g., to determine whether the leader node 138 has been previously configured to be able to acquire a burst cluster) via an auth service 144. Assuming the authorization was successful, at 206 the burst service manager 126 may select a cluster 206 from a warm pool of available clusters by consulting a database 146 and updating the database 146 to mark the selected cluster as being acquired. At 208, the burst service manager 126 may obtain the shared secret key the database, or in other embodiments obtain it from a secure store of the provider network, etc.

At 210, the burst service manager 126 sends a response back to the leader node that includes an identifier of the acquired cluster (e.g., a resource name that within the context of the provider network uniquely identifies the cluster) and in identifier of a storage location where the shared secret key may be obtained (e.g., a path, URI, etc.).

At 212, the leader node 138 then connects to the proxy instance, for example, via a TLS connection, and sends a "connect" request (e.g., carried by an HTTP request) to the proxy. This connect request may be signed by a profile associated with the leader node so that the proxy instance 114A can authenticate the source of request and/or authorize the leader node 138 at 214. The connect request may include the identifier of the acquired cluster.

The proxy instance, at 216, may then verify the assignment of the leader node to the particular burst cluster leader node by performing a lookup/search in the database 146. At 218, proxy instance may return a response (e.g., carried by an HTTP response) message to the leader node indicating that the connection will be allowed/has been created. At 220, the proxy instance may set up another connection to the leader node of the burst cluster. This connection maybe an encrypted connection, for example, a TLS connection.

The leader node 138 may then use the shared secret key value to encrypt a data element, resulting in an encrypted value. The data element may be a derivable (from the context of both the leader node 138 and the leader node 122) data item, and based on or including data such as an identifier of one or both of the leader nodes 138/122, a date, an hour of the day, etc.

At 224, the leader node sends a connect request with the encrypted value to the burst leader node via the proxy instance. The burst leader node 122 can authenticate this message, authorize the main leader node 138 at 226, and use the shared secret key value (stored in the leader node 122 or burst cluster 120A as described herein) to attempt to generate same encrypted value (as generated by the leader node 138) using the same shared secret key value and the same known algorithm (e.g., encrypt the identifier of the leader node 122, encrypt a concatenated string including the identifier of the leader node 138 and leader node 122, or some other value or combination of values, etc.). Upon a match, the burst cluster leader node 122 has validated the legitimacy of the message as having been generated by the main cluster leader node 138 (and not some other random node) and also that the main cluster leader node 138 has been granted access to the burst cluster 120A by the burst service 108 (as the main cluster leader node 138 had access to the proper shared secret key 150).

Alternatively, other encryption schemes can be utilized to assist the burst cluster leader node in determining whether the origin of the connect request is legitimate. For example, an encrypted value could be generated (by the main cluster leader node 138) using the shared secret key value to encrypt a piece of information—e.g., a particular value, or even a particular data element that is of practical use such as a federated token. A federated token is a value that can be used as temporary credentials to allow the burst leader node 122 the ability to operate upon necessary database data or perform other operations with the explicit consent (via possession of the federated token) of the main cluster leader node 138. In some embodiments, the burst leader node may decrypt such an encrypted value using the shared secret key value and attempt to use the federated token to access database data (e.g., to ultimately query against) or another system allowing access to the data, and upon a successful use the burst leader node has effectively determined that the main cluster leader node did in fact obtain the correct shared secret key value for that burst leader node. If the decrypted federated token would not have worked, then the burst cluster leader node would have effectively determined that whatever entity generated the encrypted federated token did not properly have the shared secret key value of that burst cluster.

At 230, the burst cluster leader node may send a response via the proxy instance back to the main cluster leader node indicating that a connection been successfully established. At that point, the main cluster leader node, at 232, may begin to off load queries to be processed to the leader node of the burst cluster.

In this case, as the proxy instance 114A has generated two encrypted tunnels (with the main cluster leader node, and with the burst cluster leader node), the proxy instance 114A may need to decrypt messages received from the main cluster leader node and then re-encrypt the message to be sent over the other connection to the burst cluster leader node; the same is true in the reverse direction. This can be computationally expensive and slow. Moreover, this configuration may result in a brief instance in time where the burst proxy 110 may have access to the unencrypted traffic passing between the leader nodes.

Figure 3:
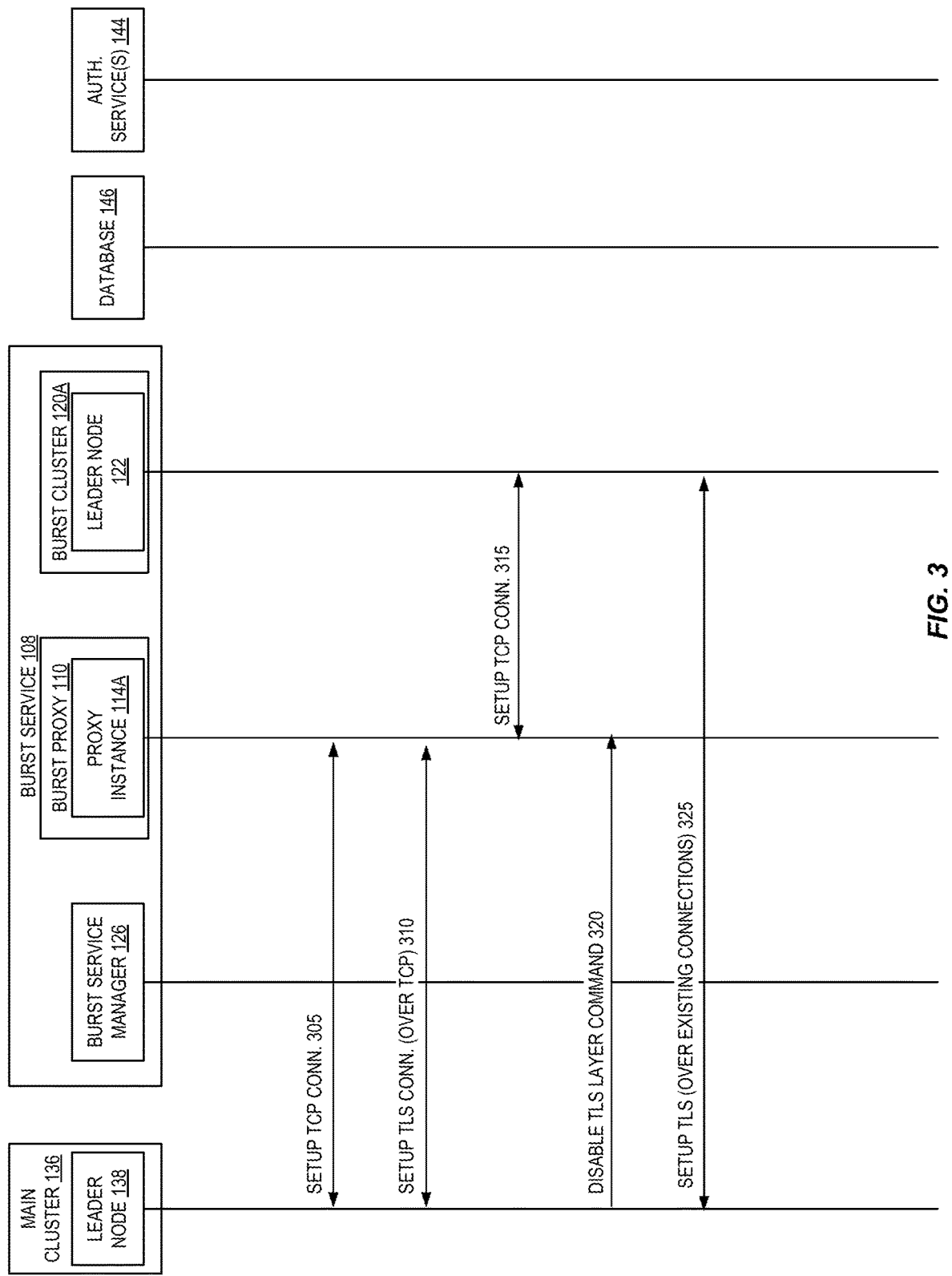
FIG. 3 is a diagram illustrating exemplary messaging between components of an environment for implementing uninterrupted encrypted communications through a multitenant component in a provider network according to some embodiments.

To even further improve upon this scenario, FIG. 3 is a diagram illustrating exemplary messaging between components of an environment for implementing uninterrupted encrypted communications through a multitenant component in a provider network according to some embodiments. These messages loosely relate to messages 212 and 224 of FIG. 2, though of course some messages and actions have been removed here to ensure the clarity of disclosure. In this figure, an encrypted end-to-end tunnel is created over two connections, one of which switches from being encrypted to non-encrypted, which retains privacy via the encryption during some helpful stages and eliminates the use of encryption once the full end-to-end tunnel is up and running.

At 305, the main cluster leader node may establish a non-encrypted (e.g., TCP) connection to the burst proxy, and at 310 establish an encrypted (e.g., TLS) connection to the burst proxy based on the non-encrypted TCP connection. The burst proxy 110, at 315, may establish a non-encrypted TCP connection to the burst cluster leader node 122. At this point, the burst proxy 110 may start to forward traffic between the main cluster leader node and the burst cluster leader node.

The main cluster 136 leader node 138 may now, at 320, disable the encryption (TLS) layer for the current connection (that was setup at 310), resulting in the connection effectively going back to being a simple TCP connection. This may occur by, for example, removing the use of the TLS handler logic layer for the connection on the client side, to thus discard the previous TLS session data. The main cluster 136 leader node 138 may then, at 325, establish a new encrypted (e.g., TLS) connection with the burst leader node over the existing connection via the burst proxy 110 that passes through to the burst leader node 122 over the un-encrypted (TCP) connection between the burst proxy 110 and the burst cluster leader node 122.

As a result, the traffic remains encrypted as it passes through the burst proxy 110, which simply needs to forward encrypted traffic over two different TCP connections, resulting in faster performance and the inability of the multitenant burst proxy to see the content of the communications.

Figure 4:
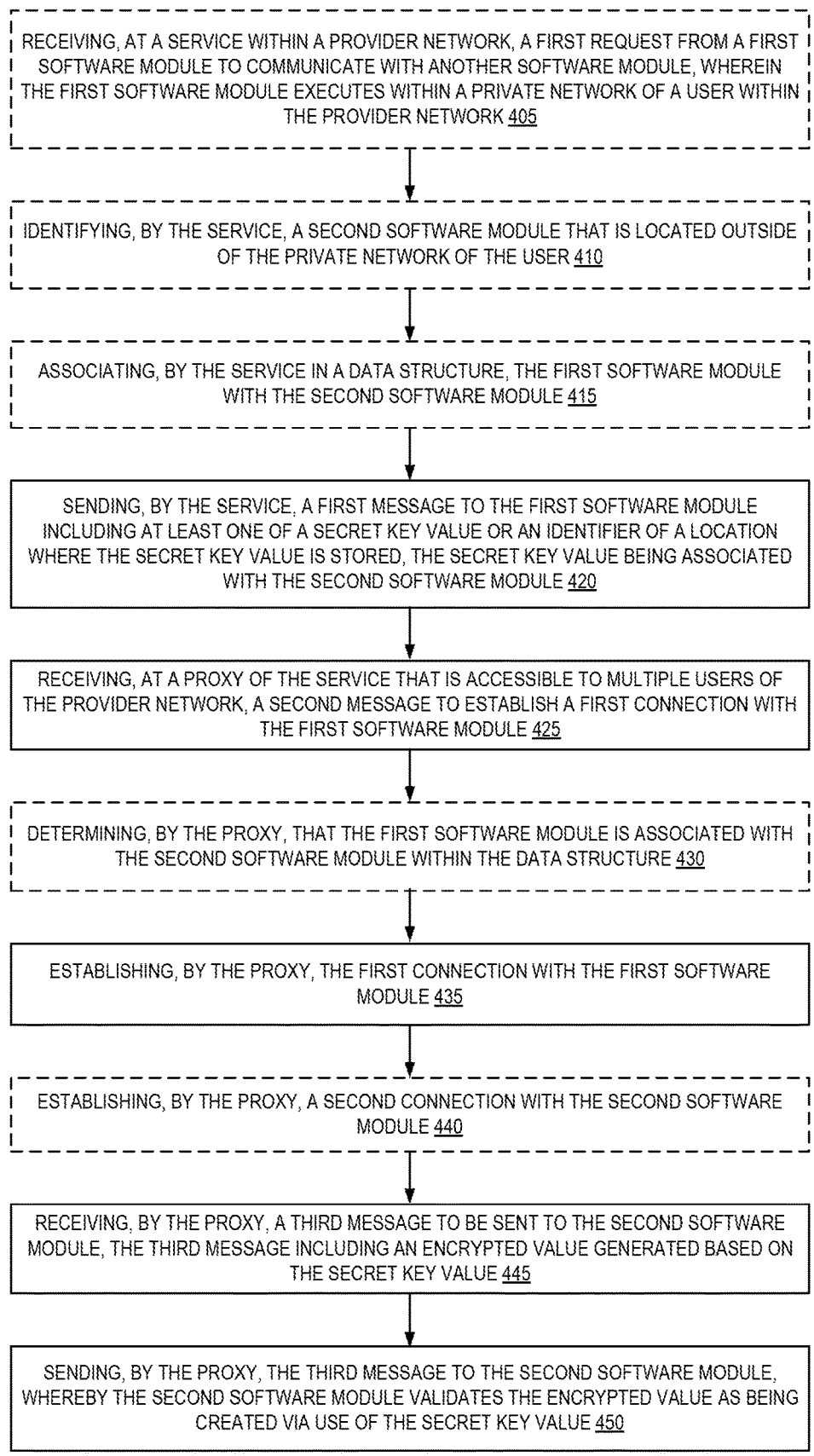
FIG. 4 is a flow diagram illustrating operations of a method for rapid secure authentication and communications through multitenant components in a provider network according to some embodiments.

FIG. 4 is a flow diagram illustrating operations of a method for rapid secure authentication and communications through multitenant components in a provider network according to some embodiments.

Some or all of the operations 400 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 400 are performed by components of the burst service 108 of the other figures.

Optionally, the operations include, at block 405, receiving, at a service within a provider network, a first request from a first software module to communicate with another software module, wherein the first software module executes within a private network of a user within the provider network. Block 405 may be performed by the burst service manager 126 of the other figures. The first software module may comprise a node of a cluster of nodes forming a database such as a data warehouse. The first request may indicate that the first software module (or the node of a cluster) seeks to acquire another software module (or cluster) to be used for performing processing tasks and may be carried in an HTTP request message.

Optionally, at block 410, the operations include identifying, by the service, a second software module that is located outside of the private network of the user. Block 410 may be performed by the burst service manager 126 of the other figures and may include accessing a database table or entry (or similar data structure) to identify a software module (e.g., a burst cluster) that is available and has not yet been assigned.

The operations also optionally include, at block 415, associating, by the service in a data structure, the first software module with the second software module. Block 415 may be performed by the burst service manager 126 of the other figures and may include updating a database table or entry (or similar data structure) to identify that the second software module has been assigned to (or reserved for) the first software module.

At block 420, the operations include sending, by the service, a first message to the first software module including at least one of a secret key value or an identifier of a location where the secret key value is stored, the secret key value being associated with the second software module. Block 420 may be performed by the burst service manager 126 of the other figures. The first message may be sent in response to the first request received at block 405 and may be carried by an HTTP response message. The first message may also include an identifier of the second software module, such as a resource name associated with the second software module and/or a network address associated with the second software module.

The operations include, at block 425, receiving, at a proxy of the service that is accessible to multiple users of the provider network, a second message to establish a first connection with the first software module. Block 425 (and subsequent blocks 430, 435, 440, 445, 450) may be performed by the burst proxy 110, and possibly a proxy instance 114, of the other figures. At block 430, the operations optionally include determining, by the burst proxy, that the first software module is associated with the second software module within the data structure. Block 430 may include performing a lookup in the data structure (e.g., database) to determine whether the second software module has been marked as being assigned to (or reserved for) the first software module.

The operations include, at block 435, establishing, by the proxy, the first connection with the first software module. Block 435 may include setting up a TLS or other encrypted connection with the first software module.

At block 440, the operations optionally include establishing, by the proxy, a second connection with the second software module. Block 440 may include establishing an unencrypted (e.g., TCP) connection or an encrypted (e.g., TLS) connection with the second software module.

The operations include, at block 445, receiving, by the proxy, a third message to be sent to the second software module, the third message including an encrypted value generated based on the secret key value. The third message may be a request to "connect" the first software module with the second software module, and the encrypted value may be the result of the first software module having encrypted a federated token. A federated token may act as credentials to allow the second software module to perform an action within the provider network (e.g., access or read data, such as from a set of backups) by permission of the first software module.

At block 450, the operations include sending, by the proxy, the third message to the second software module, whereby the second software module validates the encrypted value as being created via use of the secret key value.

Figure 5:
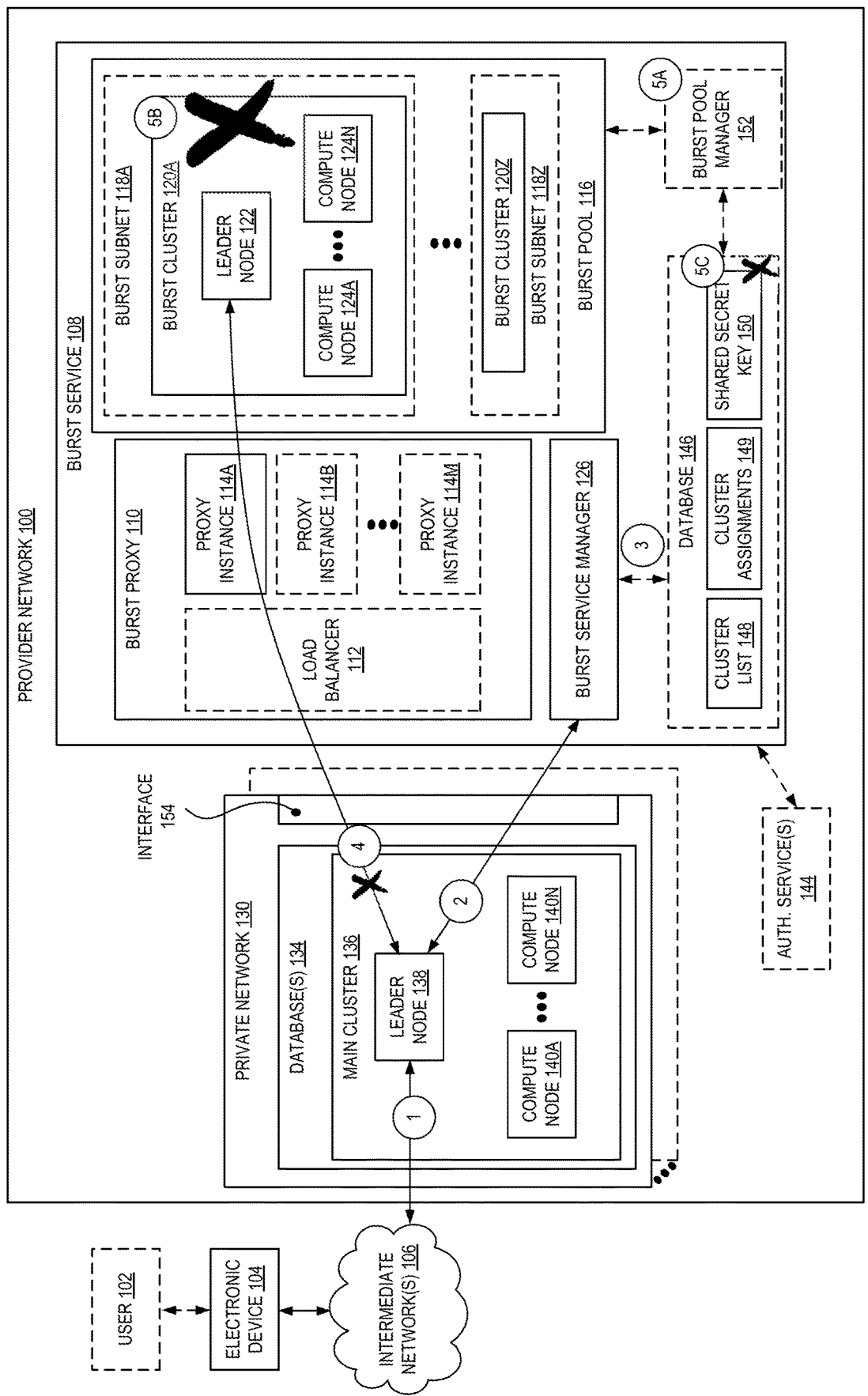
FIG. 5 is a diagram illustrating exemplary messaging between components of an environment for releasing a cluster according to some embodiments.

Such connections (and resources) may also be torn down when they are no longer needed. FIG. 5 is a diagram illustrating exemplary messaging between components of an environment for releasing a cluster according to some embodiments. At circle (1), the leader node 138 has finished processing a query from a client and sends a response directed to the electronic device 104. At circle (2), the leader node 138 sends a message to ask the burst service manager 126 to release a burst cluster. The burst service manager 126 can authorize the incoming request, and at circle (3) find a burst cluster allocated for the current leader node 138 in the database 146 cluster assignments 149 (e.g., table) and marks it as being released.

At circle (4), the leader node 138 closes the connection to the burst proxy 110 and/or the burst proxy 110 terminates the connection to the leader node 122 of the burst cluster 120A. At circle (5A), the burst pool manager 152 issues commands to delete any released cluster(s) at circle (5B), and at circle (5C) causes the shared secret key(s) 150 to be deleted for the deleted cluster(s). Thus, circle (5A) may be part of a periodic cleanup process made by the burst pool manager 152, though in other embodiments circle (5A) may be triggered responsive to the cluster assignments 149 being updated by the burst service manager 126.

In some embodiments, a burst cluster 120A may also be released and removed based on a "heartbeat" type mechanism. For example, the burst pool manager 152 (or another component of the burst service 108, such as the burst service manager 126 or the burst proxy 110, or even another component of the provider network 100) may monitor a usage status of the burst cluster 120A or of one or more of the connection(s) between the burst cluster 120A and the main cluster 136 to identify whether the usage is nonexistent for some period of time that exceeds some timeout threshold. This monitoring may occur in a variety of ways, such as by observing logs or state of these components/connections, viewing data reported by these components/connections to a logically centralized monitoring service, receiving inactivity beacons sent by the cluster 120A, etc.

Thus, when a burst cluster 120A isn't used for some amount of time (e.g., 30 seconds, 2 minutes, 5 minutes, 20 minutes, etc.), the burst pool manager 152 (or other component) may tear down the burst cluster 120A, e.g., by updating the cluster assignments 149, deleting the shared secret key 150, terminating the burst cluster 120A, etc. Notably, the simple deletion of a shared secret key 150 may be used in this process or in other processes—such as to further "harden" the burst cluster 120A—by even further eliminating the ability for another entity to use that key to access the cluster.

Figure 6:
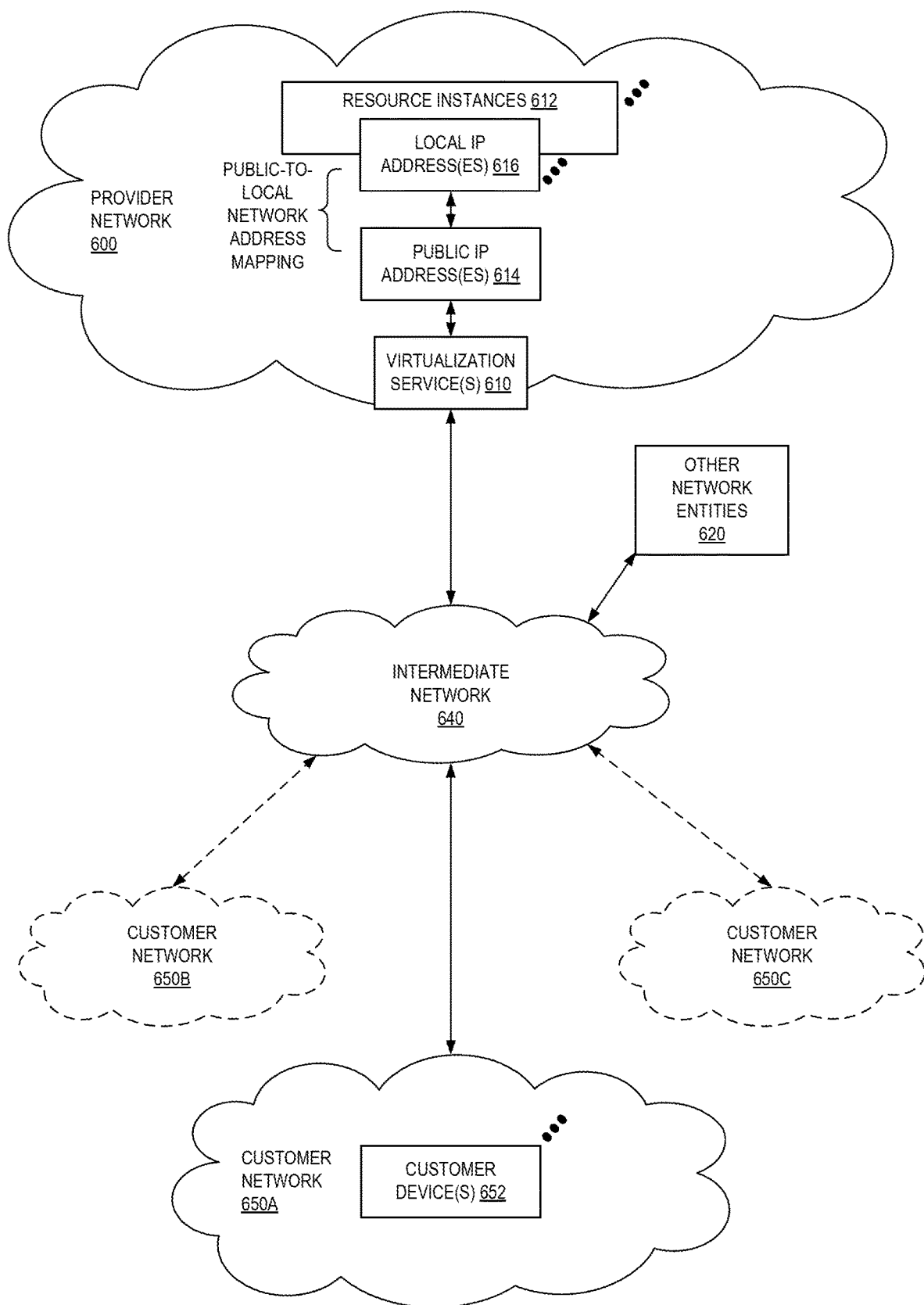
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
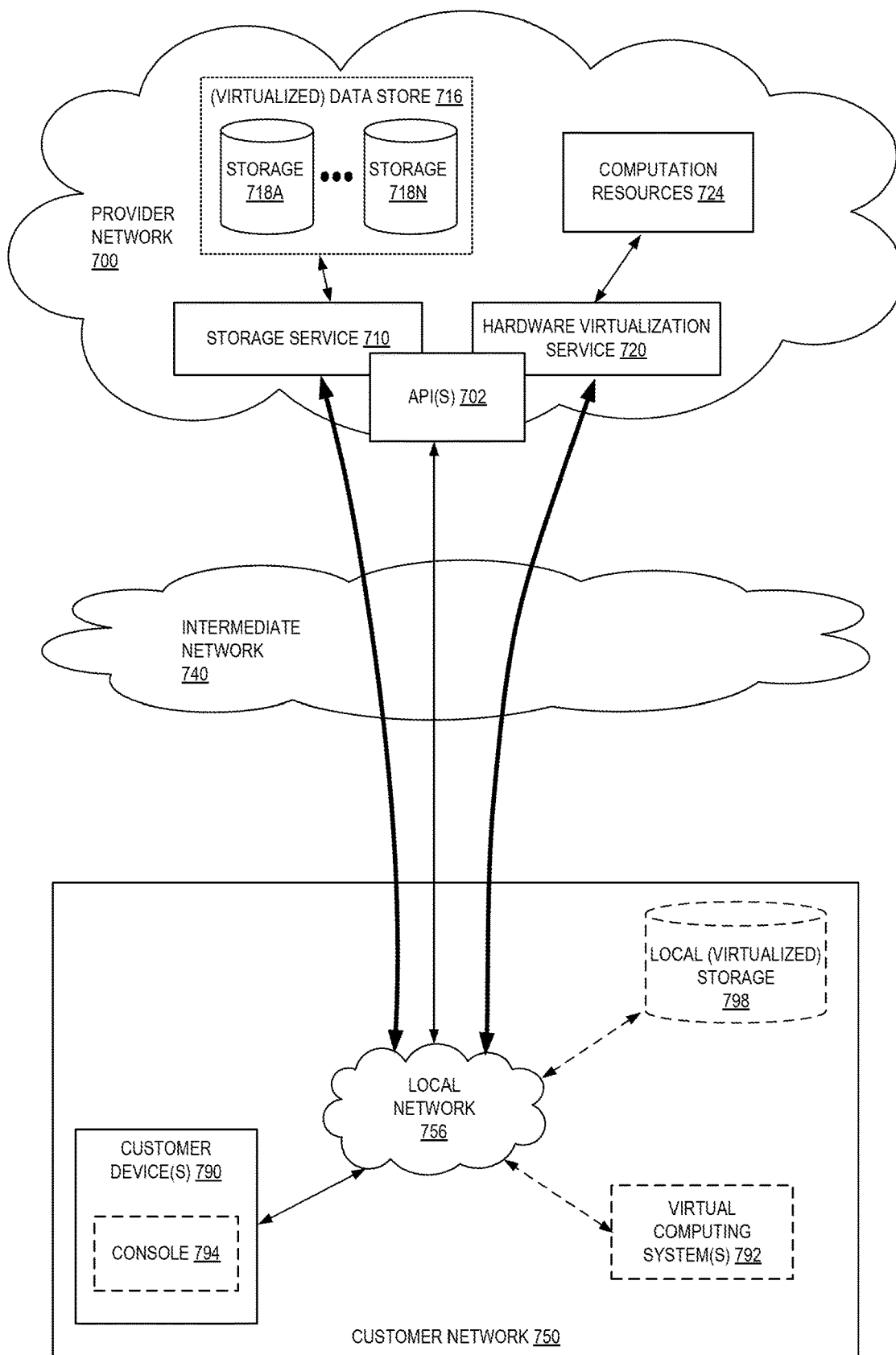
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Figure 8:
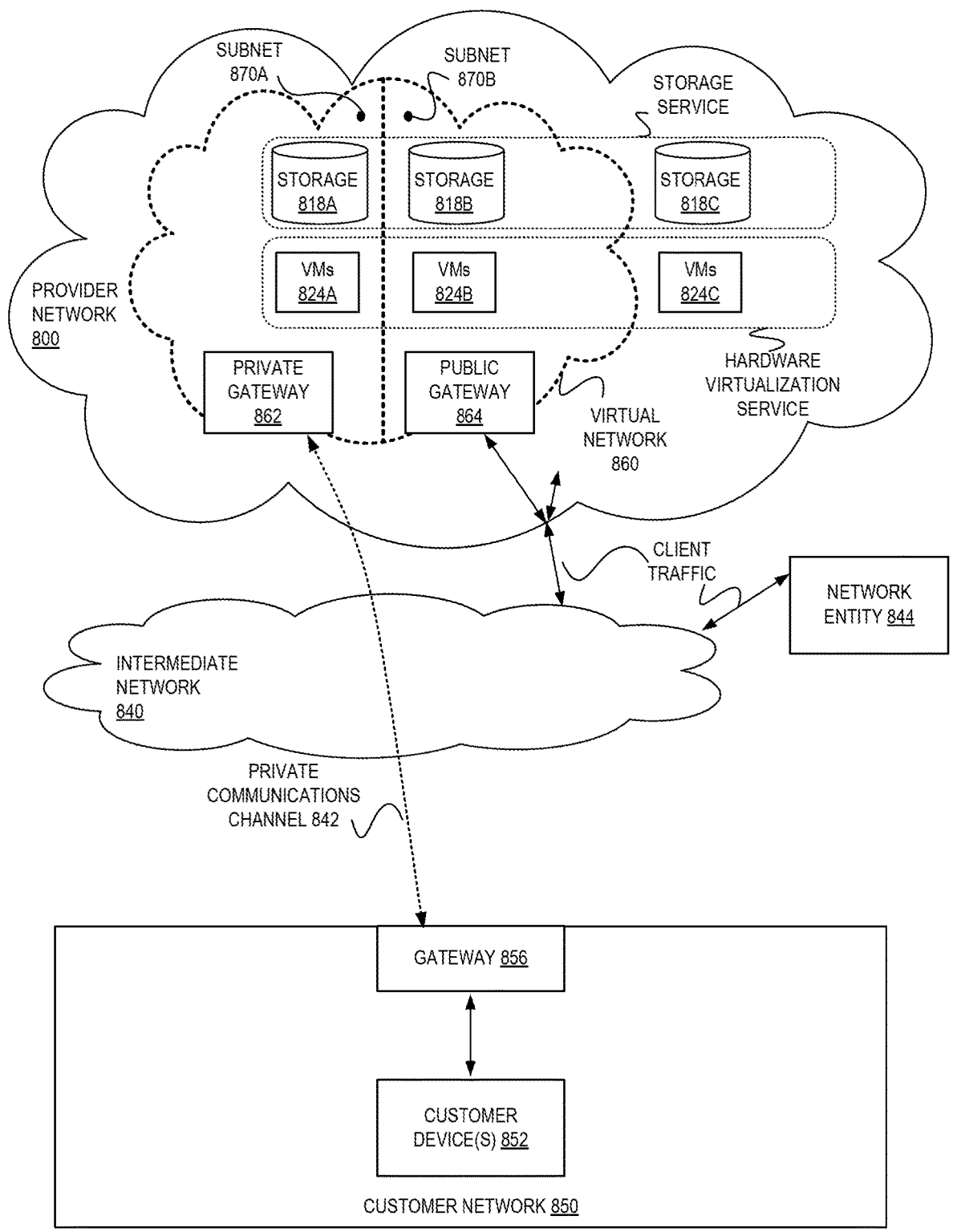
FIG. 8 illustrates an example provider network that provides virtual networks on the provider network to at least some customers according to some embodiments.

FIG. 8 illustrates an example provider network that provides virtual networks on the provider network to at least some customers, according to some embodiments. A customer's virtual network 860 on a provider network 800, for example, enables a customer to connect their existing infrastructure (e.g., one or more customer devices 852) on customer network 850 to a set of logically isolated resource instances (e.g., VMs 824A and 824B and storage 818A and 818B), and to extend management capabilities such as security services, firewalls, and intrusion detection systems to include their resource instances.

A customer's virtual network 860 may be connected to a customer network 850 via a private communications channel 842. A private communications channel 842 may, for example, be a tunnel implemented according to a network tunneling technology or some other technology over an intermediate network 840. The intermediate network may, for example, be a shared network or a public network such as the Internet. Alternatively, a private communications channel 842 may be implemented over a direct, dedicated connection between virtual network 860 and customer network 850.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In some embodiments, either a shared network or a public network may serve as an intermediate network between a provider network and a customer network.

To establish a virtual network 860 for a customer on provider network 800, one or more resource instances (e.g., VMs 824A and 824B and storage 818A and 818B) may be allocated to the virtual network 860. Note that other resource instances (e.g., storage 818C and VMs 824C) may remain available on the provider network 800 for other customer usage. A range of public IP addresses may also be allocated to the virtual network 860. In addition, one or more networking nodes (e.g., routers, switches, etc.) of the provider network 800 may be allocated to the virtual network 860. A private communications channel 842 may be established between a private gateway 862 at virtual network 860 and a gateway 856 at customer network 850.

In some embodiments, in addition to, or instead of, a private gateway 862, virtual network 860 may include a public gateway 864 that enables resources within virtual network 860 to communicate directly with entities (e.g., network entity 844) via intermediate network 840, and vice versa, instead of or in addition to via private communications channel 842.

Virtual network 860 may be, but is not necessarily, subdivided into two or more subnetworks, or subnets, 870. For example, in implementations that include both a private gateway 862 and a public gateway 864, a virtual network 860 may be subdivided into a subnet 870A that includes resources (VMs 824A and storage 818A, in this example) reachable through private gateway 862, and a subnet 870B that includes resources (VMs 824B and storage 818B, in this example) reachable through public gateway 864.

The customer may assign particular customer public IP addresses to particular resource instances in virtual network 860. A network entity 844 on intermediate network 840 may then send traffic to a public IP address published by the customer; the traffic is routed, by the provider network 800, to the associated resource instance. Return traffic from the resource instance is routed, by the provider network 800, back to the network entity 844 over intermediate network 840. Note that routing traffic between a resource instance and a network entity 844 may require network address translation to translate between the public IP address and the local IP address of the resource instance.

Some embodiments may allow a customer to remap public IP addresses in a customer's virtual network 860 as illustrated in FIG. 8 to devices on the customer's external network 850. When a packet is received (e.g., from network entity 844), the network 800 may determine that the destination IP address indicated by the packet has been remapped to an endpoint on external network 850 and handle routing of the packet to the respective endpoint, either via private communications channel 842 or via the intermediate network 840. Response traffic may be routed from the endpoint to the network entity 844 through the provider network 800, or alternatively may be directly routed to the network entity 844 by the customer network 850. From the perspective of the network entity 844, it appears as if the network entity 844 is communicating with the public IP address of the customer on the provider network 800. However, the network entity 844 has actually communicated with the endpoint on customer network 850.

While FIG. 8 shows network entity 844 on intermediate network 840 and external to provider network 800, a network entity may be an entity on provider network 800. For example, one of the resource instances provided by provider network 800 may be a network entity that sends traffic to a public IP address published by the customer.

Figure 9:
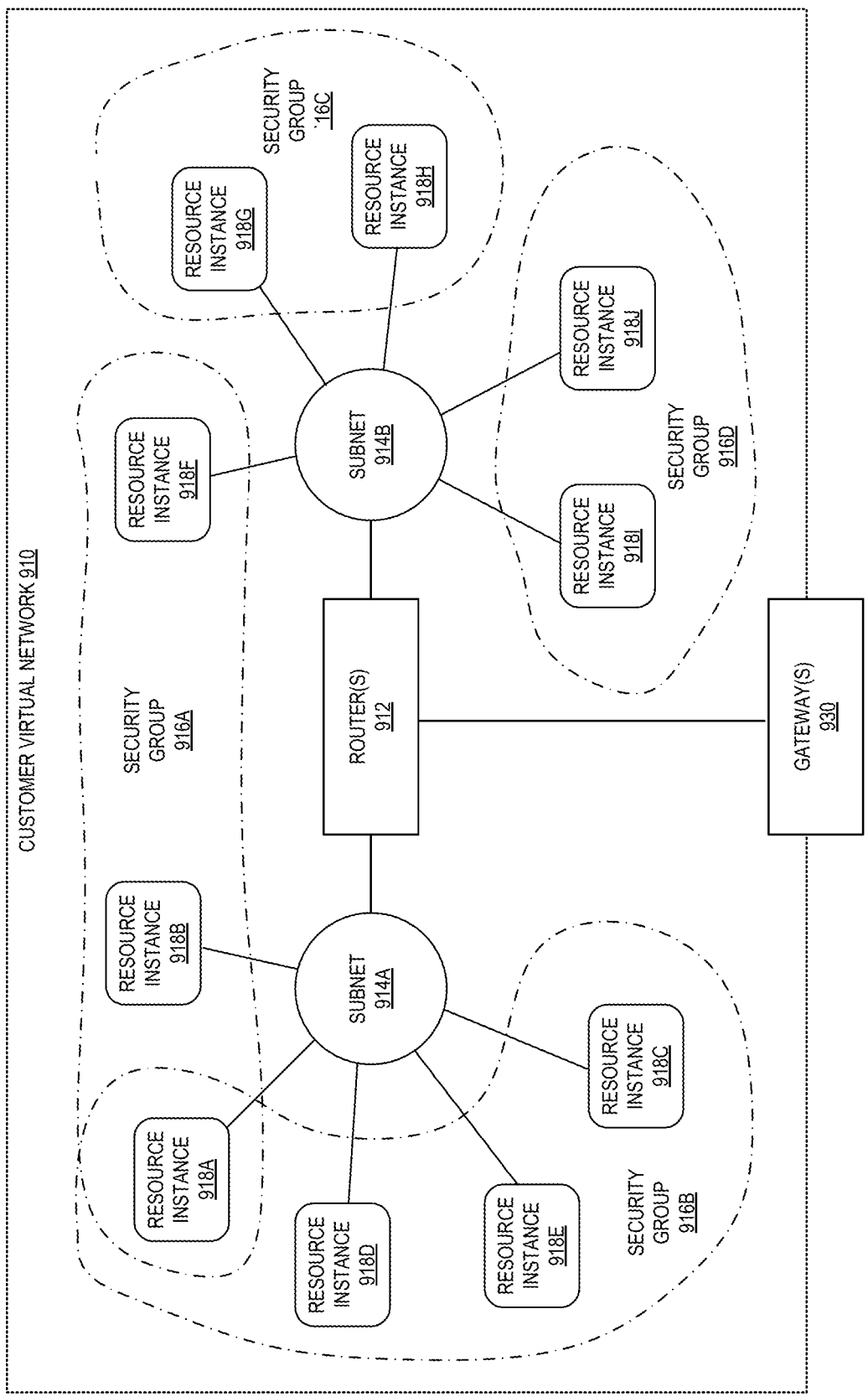
FIG. 9 illustrates subnets and security groups in an example virtual network on a provider network according to some embodiments.

FIG. 9 illustrates subnets and security groups in an example virtual network 910 on a provider network, according to some embodiments. In some embodiments, a provider network such as provider network 800 in FIG. 8 may allow the customer to establish and manage virtual security groups 916 (e.g., 916A-916D) within the customer's virtual network 910, within or across subnets 914. A security group 916 is a logical grouping of resource instances 918 and acts as a virtual firewall that controls the traffic allowed to reach one or more resource instances 918 within the security group 916 according to security group rules. The customer may establish one or more security groups 916 within the virtual network 910, and may associate each resource instance 918 in the virtual network 910 with one or more of the security groups 916. In some embodiments, the customer may establish and/or modify rules for each security group 916 that control the inbound traffic allowed to reach the resource instances 918 associated with the security group 916.

In the example virtual network 910 shown in FIG. 9, the virtual network 910 is subdivided into two subnets 914A and 914B. Access to the virtual network 910 is controlled by gateway(s) 930. Each subnet 914 may include at least one router 912 that acts to route traffic to (and from) resource instances 918 on the respective subnet 914. In some embodiments, network access control lists (ACLs) may be used to control access to the subnets 914 at router(s) 912. In the example shown in FIG. 9, resource instances 918A through 918E are on subnet 914A, and resource instances 918F through 918J are on subnet 914B. The customer has established four security groups 916A through 916D. As shown in FIG. 9, a security group may extend across subnets 914, as does security group 916A that includes resource instances 918A and 918B on subnet 914A and resource instance 918F on subnet 914B. In addition, a resource instance 918 may be included in two or more security groups 916, as is resource instance 918A which is included in security group 916A and 916B.

Illustrative System

Figure 10:
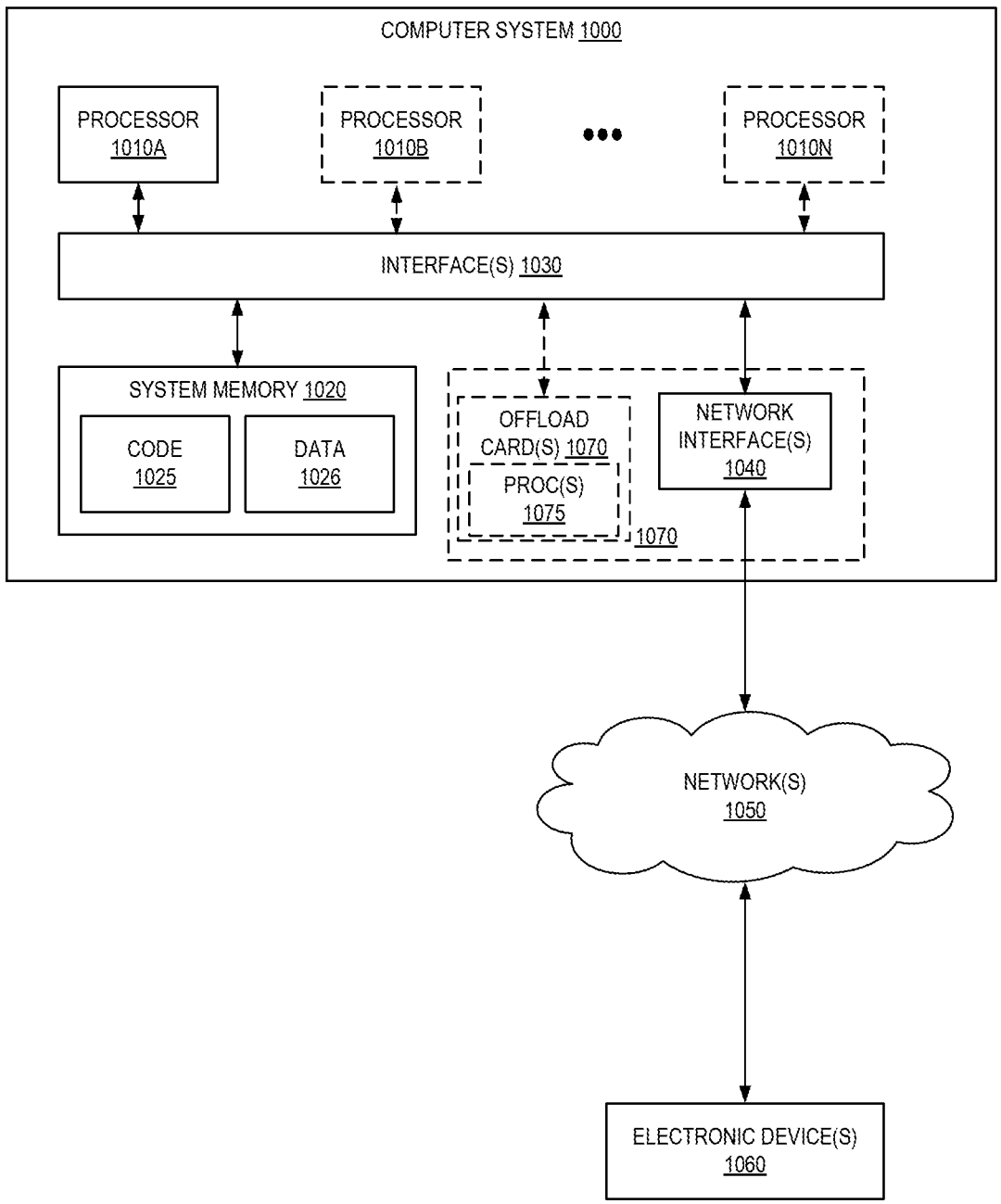
FIG. 10 is a block diagram illustrating an example computer system that may be used in some embodiments.

In some embodiments, a system that implements a portion or all of the techniques for rapid secure authentication and communications through multitenant components in a provider network as described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as code 1025 and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, etc. These management operations may, in some embodiments, be performed by the offload card(s) 1070 in coordination with a hypervisor (e.g., upon a request from a hypervisor) that is executed by the other processors 1010A-1010N of the computer system 1000. However, in some embodiments the virtualization manager implemented by the offload card(s) 1070 can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/ or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, at a burst service manager implemented within a provider network, a request from a first node of a first cluster to acquire another cluster, wherein the first node executes within a private network of a user within the provider network;
   selecting, by the burst service manager, a second cluster from a plurality of available clusters;
   associating, in a data structure, the first cluster with the second cluster;
   sending, by the burst service manager to the first node, a message including an identifier of the second cluster and either a secret key value associated with the second cluster or an identifier of a location where the secret key value is stored;
   receiving, at a burst proxy, a request from the first node to create a first connection;
   determining, by the burst proxy, that the first cluster is associated with the second cluster within the data structure;
   establishing, by the burst proxy, the first connection with the first node and a second connection with a second node of the second cluster;
   receiving, at the burst proxy, a request over the first connection to generate a third connection between the first node and the second cluster, the request including an encrypted value generated based on the secret key value;
   sending, by the burst proxy, the request to the second cluster over the second connection;
   decrypting, by a second node of the second cluster via use of the secret key value, the encrypted value from the request to yield a federated token that was obtained by the first cluster; and
   utilizing, by the second node, the federated token as a temporary credential to attempt to access data from another service of the provider network.

2. The computer-implemented method of claim 1, further comprising:
   receiving, by the burst proxy over the first connection, a message that was originated by the first node that comprises a database query; and
   sending, by the burst proxy to the second node over the second connection, a message comprising the database query, whereby the second node causes the second cluster to execute the database query and return a result.

3. The computer-implemented method of claim 1, further comprising:
   receiving, at the burst service manager, a request originated by the first node to release the second cluster;
   terminating, by the burst proxy, the second connection with the second cluster;
   deleting at least a copy of the secret key value; and
   terminating the second cluster.

4. A computer-implemented method comprising:
   receiving, by a manager of a service of a provider network from a first software module that executes within the provider network, a request for additional processing resources;
   sending, by the manager, a first message to the first software module including at least one of a secret key value or an identifier of a location where the secret key value is stored, the secret key value being associated with a second software module;
   receiving, at a proxy of the service that is accessible to multiple users of the provider network, a second message to establish a first connection with the first software module;
   establishing, by the proxy, the first connection with the first software module;
   receiving, by the proxy, a third message to be sent to the second software module, the third message including an encrypted value generated based on the secret key value;
   sending, by the proxy, the third message to the second software module;
   decrypting, by the second software module via use of the secret key value, the encrypted value from the third message to yield a federated token that was obtained by the first software module; and
   utilizing, by the second software module, the federated token as a temporary credential to attempt to access data.

5. The computer-implemented method of claim 4, further comprising:
   receiving, by the service, a request from the first software module to communicate with another software module, wherein the first software module executes within a private network of a user within the provider network; and
   selecting, by the service from a plurality of software modules, the second software module to be the another software module to communicate with the first software module, wherein the second software module is located outside of the private network of the user.

6. The computer-implemented method of claim 5, further comprising:
   generating the secret key value to be associated with the second software module; and
   sending the secret key value to the second software module,
   wherein the first message includes the secret key value.

7. The computer-implemented method of claim 4, further comprising:
   associating, by the service in a data structure, the first software module with the second software module; and
   after the receiving of the second message, verifying, by the proxy, that the first software module is associated with the second software module within the data structure.

8. The computer-implemented method of claim 4, wherein:

the first software module comprises at least a first node of a first database cluster; and the second software module comprises at least a second node of a second database cluster.

9. The computer-implemented method of claim 8, further comprising:

receiving, by the proxy, a message that was originated by the first node that comprises a database query; and sending, by the proxy to the second node, a message comprising the database query.

10. The computer-implemented method of claim 4, further comprising:

establishing, by the proxy, a second connection with the second software module, wherein the proxy sends the third message to the second software module via the second connection, and wherein one or more of the first connection or the second connection is encrypted.

11. The computer-implemented method of claim 4, further comprising:

establishing, by the proxy, a second connection with the second software module, wherein the second connection is unencrypted, wherein the first software module and the second software module communicate using an encrypted connection over both the first connection and the second connection.

12. The computer-implemented method of claim 10, further comprising:

receiving, at the service, a request originated by the first software module to release the second software module;

terminating, by the proxy, the second connection with the second software module;

deleting at least a copy of the secret key value; and terminating, by the service, the second software module.

13. The computer-implemented method of claim 12, further comprising:

launching a set of one or more additional software modules into a pool of software modules, wherein the second software module before termination was in the pool and was selected, by the service, from the pool to be granted to the first software module.

14. The computer-implemented method of claim 4, wherein the first software module executes within a private network of the provider network, and wherein the first connection between the first software module and the service passes from the first software module via a first endpoint of the private network that is allowed to communicate with a second endpoint of the service but not allowed to communicate with other user resources within the provider network.

15. A system comprising:

a first cluster of nodes implemented by a first one or more electronic devices of a provider network, the first cluster comprising a leader node and one or more compute nodes to process database queries for a user; and a burst service implemented by a second one or more electronic devices of the provider network, the burst service including instructions that upon execution cause the burst service to:

receive, by a manager of the burst service from the leader node, a request to obtain another cluster for additional processing support;

send, by the manager, a first message to the leader node including at least one of a secret key value or an identifier of a location where the secret key value is stored, the secret key value being associated with a second cluster of nodes;

receive, at a proxy of the burst service that is accessible to multiple users of the provider network, a second message to establish a first connection with the first cluster;

establish, by the proxy, the first connection with the first cluster;

receive, at the proxy, a third message to be sent to the second cluster, the third message including an encrypted value generated based on the secret key value; and send, by the proxy, the third message to a second leader node of the second cluster;

wherein the first cluster comprises instructions that upon execution cause the leader node or at least one of the one or more compute nodes to:

decrypt, via use of the secret key value, the encrypted value from the third message to yield a federated token; and utilize the federated token as a temporary credential to attempt to access data from another service of the provider network.

16. The system of claim 15, wherein the instructions upon execution further cause the burst service to:

receive a request from the first cluster to communicate with another cluster, wherein the first cluster executes within a private network of the user within the provider network; and select, from a plurality of available clusters, the second cluster to be the another cluster to communicate with the first cluster, wherein the second cluster is located outside of the private network of the user.

17. The system of claim 16, wherein the instructions upon execution further cause the burst service to:

generate the secret key value to be associated with the second cluster; and send the secret key value to the second cluster, wherein the first message includes the secret key value.

18. The system of claim 15, wherein the instructions upon execution further cause the burst service to:

associate the first cluster with the second cluster in a data structure; and after the receipt of the second message, verify that the first cluster is associated with the second cluster within the data structure.

19. The system of claim 15, wherein the instructions upon execution further cause the burst service to:

receive, by the proxy, a message comprising a database query that was originated by the leader node; and send, by the proxy to the second leader node, a message comprising the database query, wherein the second leader node causes the database query to be executed by the second cluster and a result to be sent back to the leader node of the first cluster.

20. The system of claim 15, wherein the instructions upon execution further cause the burst service to:

receive a request originated by the leader node to release the second cluster;

terminate a second connection with the second cluster;

delete at least a copy of the secret key value; and terminate the second cluster.

* * * * *